United States Patent [19]

Reeves

[11] Patent Number: 4,799,526
[45] Date of Patent: Jan. 24, 1989

[54] BLIND WITH LIGHT-TRANSMITTING SLATS

[75] Inventor: John R. Reeves, Brown Deer, Wis.

[73] Assignee: Wausau Metals Corporation, Wausau, Wis.

[21] Appl. No.: 36,270

[22] Filed: Apr. 9, 1987

Related U.S. Application Data

[63] Continuation-in-part of Ser. No. 879,270, Jun. 27, 1986, abandoned, which is a continuation of Ser. No. 494,427, May 13, 1983, abandoned.

[51] Int. Cl.$^4$ .............................................. E06B 9/30
[52] U.S. Cl. .................................. 160/168.1; 160/236
[58] Field of Search ............................... 160/166–178, 160/236

[56] References Cited

U.S. PATENT DOCUMENTS

| | | | |
|---|---|---|---|
| 2,155,985 | 4/1939 | Waterman | 160/236 X |
| 2,267,869 | 12/1941 | Loehr | 160/176 X |
| 2,315,605 | 4/1943 | Ehrenfeld | 160/114 |
| 2,318,525 | 5/1943 | Renton | 160/173 |
| 2,534,673 | 12/1950 | Holland | 160/236 |
| 2,620,869 | 12/1952 | Friedman | 160/236 |
| 2,633,191 | 3/1953 | Curtis | 160/176 |
| 2,709,488 | 5/1955 | Lorentzen | 160/176 |
| 3,217,631 | 11/1965 | Thompson et al. | 98/121 |
| 3,645,317 | 2/1972 | Malone | 160/236 X |
| 4,091,592 | 5/1978 | Berlad et al. | 52/616 |
| 4,242,414 | 12/1980 | McKenzie | 160/19 X |
| 4,336,834 | 6/1982 | Schaller | 160/236 X |

FOREIGN PATENT DOCUMENTS 396738  5/1941  Canada .
512874  5/1953  Canada .
1076313  4/1980  Canada .

Primary Examiner—Ramon S. Britts
Assistant Examiner—David M. Purol
Attorney, Agent, or Firm—Lathrop & Clark

[57] ABSTRACT

A blind having an interior side and an exterior side and having a plurality of elongated slats is disclosed. The slats are made of a flexible and generally resilient polycarbonate material having selected light-transmitting qualities and superior optical clarity. Each slat has a generally V-shaped transverse cross-sectional configuration in which a first portion and a second portion of the slat correspond to the two sides of the V, intersecting at an angle of 90° to 160°. The slats are suspended in parallel relation, the slats being rotatable about their longitudinal axes between an inwardly facing position, in which the upper surfaces of the slats are presented at the interior side of the blind with the first portions of the slats substantially co-planar, and an outwardly facing portion, in which the upper surfaces are presented at the exterior side of the blind and the second portions of the slats are substantially co-planar. The slats are held at a distance from each other such that when the slats are in one of the inwardly facing and outwardly facing positions, the portions of the slats not then co-planar extend sufficiently far toward the slat immediately adjacent thereto as to overlap the immediately adjacent slat, to prevent the passage of light in a direction generally normal to the co-planar portions of the slats without that light being interrupted by the slats.

22 Claims, 3 Drawing Sheets

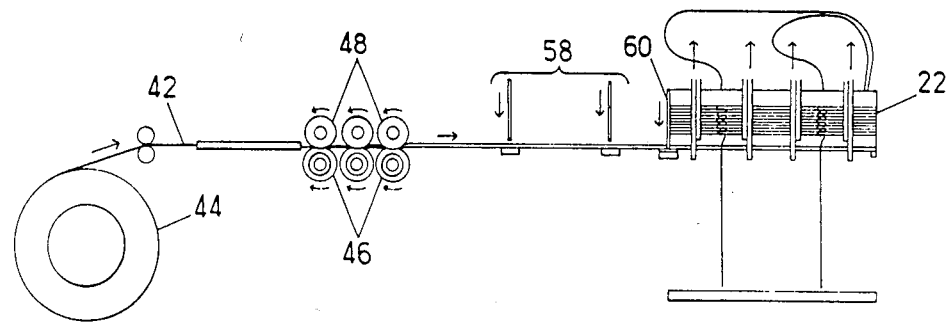
FIG. 5
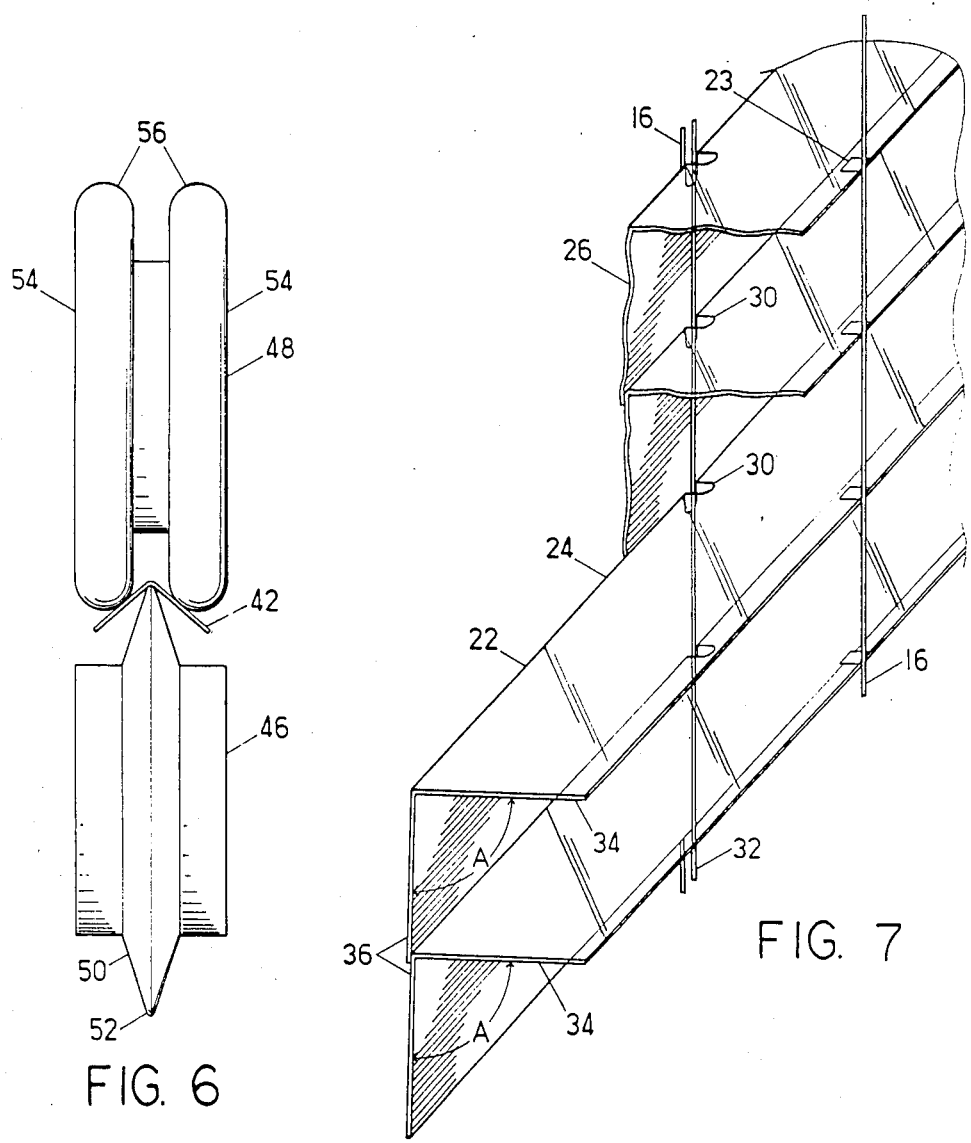
FIG. 6
FIG. 7

BLIND WITH LIGHT-TRANSMITTING SLATS

REFERENCE TO RELATED APPLICATIONS

This application is a continuation-in-part of application Ser. No. 879,270, filed June 27, 1986, now abandoned, which is a continuation of application No. 494,427, filed May 13, 1983, now abandoned, both disclosures of which are incorporated herein by reference. A related application Ser. No. 036,302, filed Apr. 9, 1987, is a division of above-identified application Ser. No. 036,270.

TECHNICAL FIELD

The present invention relates to blinds in general and, in particular, to blinds having rotatable, light-transmitting slats.

BACKGROUND OF ART

The art is generally cognizant of blinds having slats adapted to transmit at least some of the light that impinges on them. Curtis, Jr., U.S. Pat. No. 2,633,191, discloses a tiltable horizontally slatted venetian blind of very sturdy construction for use as a fireplace screen, but which is also suggested for use over windows. Friedman, U.S. Pat. No. 2,620,869, discloses a venetian blind slat construction in which the slats are made of plastic materials. Malone, U.S. Pat. No. 3,645,317 shows a conventional Venetian blind in which the slats are covered with a thin layer of metal to reflect unwanted infrared radiation and yet remain generally transparent to visible light. In the closed position, the slats of Malone overlap, doubling the light-blocking effect of the blind.

The art is also cognizant of blinds that have a selected color on one face and a second color on the other face. An example is Schaller, U.S. Pat. No. 4,336,834.

The use of blind slats bent along their longitudinal axis so as to acquire a cross sectional configuration similar to an inverted V is also known. Examples include Berlad, et al., U.S. Pat. No. 4,091,592, Renton, U.S. Pat. No. 2,318,525, and Ehrenfeld, U.S. Pat. No. 2,315,605. Thompson, et al., U.S. Pat. No. 3,217,631, shows a similar configuration employed as a fixed louver. In each case, the bent slat is opaque and is adapted not to be turned about its longitudinal axis. The purpose of the bent configuration of the slats is to block light or provide privacy while allowing a substantial flow of air.

BRIEF SUMMARY OF THE INVENTION

The present invention is summarized in that a blind having an interior side and an exterior side includes a plurality of elongated slats made of a flexible and generally resilient polycarbonate plastic material having a thickness not greater than 0.062 inches and selected light-transmitting qualities. Each slat is cold-formed to provide an upper surface and an under surface and a generally V-shaped transverse cross sectional configuration in which a first portion and a second portion of the slat correspond to the two sides of the V, the first and second portions intersecting at the apex of the V at a selected angle A of not more 170°. At least one of the first and second portions is transparent such that it provides a minimum distortion of view.

Means are provided for suspending the slats in parallel relation, the suspension means being adapted to rotate the slats about their longitudinal axes between an inwardly facing position, in which the upper surfaces of the slats are presented at the interior side of the blind with the first portions of the slats lying substantially within a single plane, and an outwardly facing position, in which the upper surfaces are presented at the exterior side of the blind and the second portions of the slats lie generally within a single plane. The suspension means is further adapted to hold the slats at a distance from each other such that when the slats are in one of the inwardly facing and outwardly facing positions, the portions of the slats not then co-planar extend sufficiently far toward the slat immediately adjacent thereto as to overlap the immediately adjacent slat to present the passage of light in a direction generally normal to the co-planar portions of the slats without that light being interrupted by the slats.

A primary object of the invention is to provide for a blind structure that is adapted to substantially cover an opening to reduce the glare and light entering through the opening but to achieve this end without blocking all of the light that passes therethrough.

A second object of the invention is to provide a blind having slats formed such that the predominant visual effect of the slats of the blind is that they present an aesthetically pleasing substantially planar surface to the viewer while still allowing for air passage therethrough.

A further object of the invention is to provide a blind capable of being selectively turned to a first position, in which the blind has a first light-transmitting quality, and a second position, in which the blind has a second and a different light-transmitting quality.

Yet another object of the invention is to provide a blind the slats of which are divided into longitudinally extending portions of differing light transmitting; absorbing and reflecting abilities or colors, the slats being adapted to exhibit predominantly one or the other light-transmitting absorbing and reflecting qualities or colors to an observer of the blind.

Another object of the invention is to provide such a blind and slats therefor that will withstand the high temperatures frequently encountered in the use of such blinds.

A further object of the invention is to provide such a blind and slats therefor that exhibit self-extinguishing burning characteristics.

Yet another object of the invention is to provide a method for making blinds having the qualities referred to above in which the blind slats are strong but nevertheless light and thin enough to be conveniently drawn up to the top of the blind with a minimum of effort into a slender stack of slats.

Another object of the invention is to provide a blind in which the slats prevent passage of select wavelengths of visible light while at the same time permit vision through the slats of the blind with outstanding optical clarity.

Other objects, features, and advantages of the invention will be apparent from the following detailed description taken in conjunction with the accompanying drawings showing a preferred embodiment of the blind exemplifying the principles of the invention.

BRIEF DESCRIPTION OF THE DRAWINGS

FIG. 5 is a schematic representation of a manufacturing arrangement for the blind of the invention.

FIG. 6 is a schematic side elevation view of a pair of forming rollers.

FIG. 7 is a perspective view corresponding to that of FIG. 4 showing an alternative embodiment of the slats of the invention, with several slats broken away.

DETAILED DESCRIPTION OF THE PREFERRED EMBODIMENT

Figure 1:
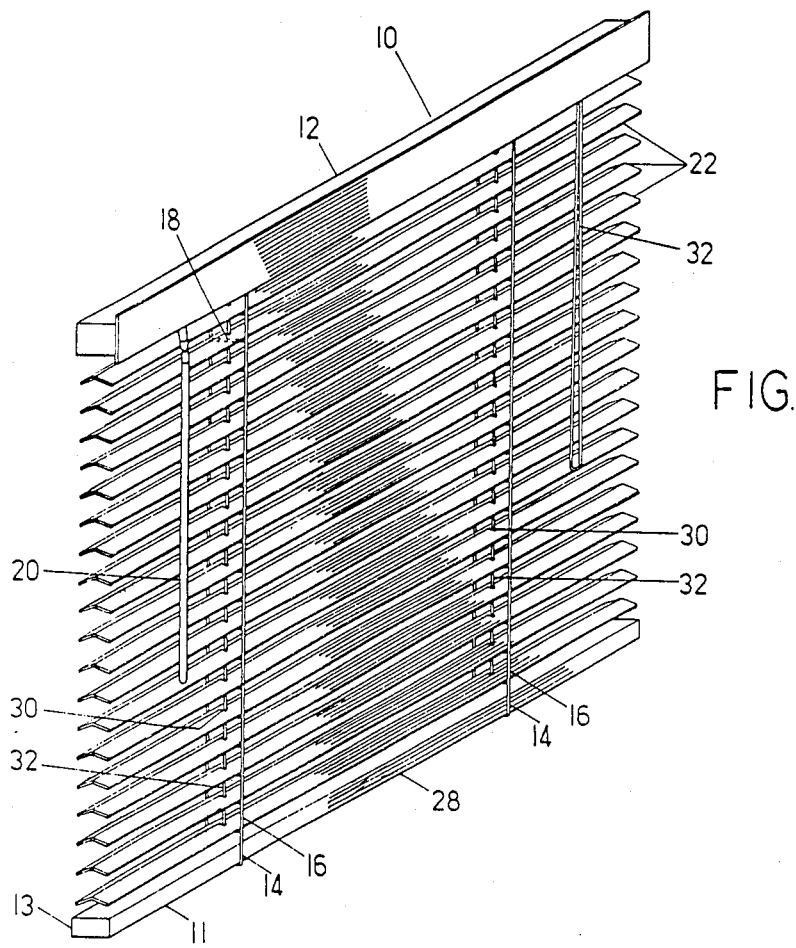
FIG. 1 is an isometric perspective view of a blind for a window made in accord with the principles of the invention.

Referring more particularly to the drawings, wherein like numbers refer to like parts, FIG. 1 shows an interiorly used venetian-type blind, generally indicated at 10, made in accord with the present invention. The blind 10 shown is especially adapted to be used to cover a window, but the blind of the invention may be used to cover other openings or to provide a blind independent of an opening. For convenience of reference, the blind 10 is determined to have an interior side 11 and exterior side 13. A head rail 12 extends across the top of the blind 10 and is adapted to be mounted horizontally. The head rail 12 includes a tilt rod (not shown) extending lengthwise therein and adapted to turn about its longitudinal axis. Ladders 14 made of string or other flexible materials extend downwardly from the head rail 12. Each ladder has parallel side strands 16 connected by spaced rungs 18, shown in phantom in FIG. 1. The side strands are wound on the tilt rod, so that, as the tilt rod is rotated about its longitudinal axis one way or the other, each side strand 16 of each ladder 14 is alternately raised or lowered. Preferably a wand 20 is provided that is attached to the tilt rod by a conventional mechanical linkage (not shown) such that when the wand is turned about its longitudinal axis, the tilt rod turns in a corresponding fashion.

The blind 10 has elongated slats 22 that, in the embodiment shown in FIG. 1, extend the width of the blind and are supported by rungs 18 of at least two ladders 14 or by comparable means for support. In the embodiment of the invention shown in FIG. 7, the rungs 18 are omitted, and tabs 23 are employed as an alternative means for support. The tabs 23 are flexibly attached to the side strands 16, effectively moving in hinged relation thereto. The tabs 23 are securely adhered to the slats 22, to support them on the side strands 16. Other conventional support means are familiar to one skilled in the art and fall within the scope and spirit of the invention.

As the side strands 16 of the ladders 14 are moved as a consequence of the rotation of the tilt rod, each slat 22 may be rotated about its longitudinal axis in concert with the other slats. Each slat has an upper surface 24 and an under surface 26. The slats 22 may be held in a netural position, shown in FIG. 2, in which the upper surface 24 is presented toward the head rail 12. From this neutral position, the slats may be rotated to an inwardly facing position, shown in FIG. 3, in which the upper surface 24 is presented at the interior side 11 of the blind 10, and to an outwardly facing position, shown in FIG. 4, in which the upper surface 24 is presented at the exterior side 13 of the blind.

The ladders 14, with their side strands 16 and rungs 18 (or equivalent support means such as the tabs 23) constitute means for suspension of the slats 22 adapted to selectively rotate the slats about their longitudinal axes. Clearly alternative suspension means are possible. Slats 22 could be supported from their ends and rotated by any of many means known in the art. The suspension means shown in adapted to support the slats 22 in a generally horizontal orientation. However, conventional suspension means are known whereby the slats 22 could be held so as to extend generally vertically. All such alternative embodiments are within the scope and spirit of the invention.

In the embodiment shown in FIG. 1, a sill rail 28 is located beneath the slat 22 most remote from the head rail 12. The side strands 16 of the ladders 14 are fastened to the sill rail, which rotates along its longitudinal axis as the slats 22 are rotated. Each slat 22 has cord slots 30 extending between the upper and under surface 24, 26 thereof. Each slat 22 has at least two cord slots 30, and each slot is preferably located at a point at which the slat is supported by the support means of a ladder 14. Lift cords 32 extend from the sill rail 28 upwardly through each set of corresponding cord slots 30 of the slats 22. The lift cords 32 extend to the head rail 12 and are routed over pulleys or comparable mechanisms (not shown) to a convenient side location. Preferably a cord lock (not shown) is fastened to the head rail 12, and the lift cords 32 are routed therethrough. The cord lock is adapted to selectively lock and release the lift cords 32, so that a user of the blind may pull the lift cords 32, moving the sill rail 28 and the slats 22 to a raised position, and then lock the lift cords 32 by means of the cord lock to cause that raised position to be maintained.

Figure 2:
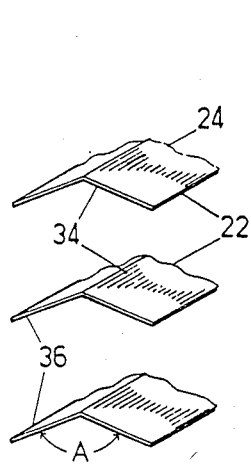
FIG. 2 is a perspective view of broken away portions of several of the adjacent slats of the blind of FIG. 1.
Figure 3:
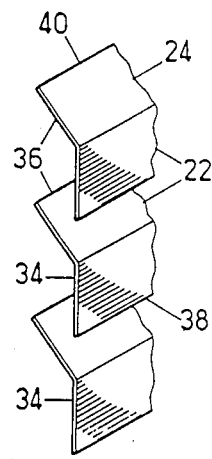
FIG. 3 is a perspective view of the slats of FIG. 2 in a closed position.
Figure 4:
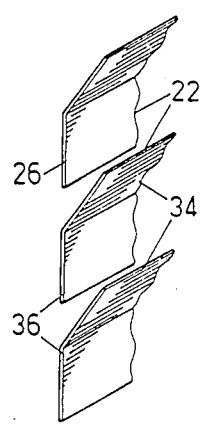
FIG. 4 is a perspective view of the slats of FIG. 2 in an alternative closed position.

The preferred embodiment of the slat 22 of the invention has a V-shaped transverse cross sectional configuration, as is apparent in FIGS. 2, 3, and 4. Preferably the V-shape opens generally downwardly, but a generally upwardly opening orientation is also possible, as are sideways opening orientations in the event that the slats are held vertically by an alternative suspension means, as is discussed above. All such alternative embodiments are within the scope and spirit of the invention. Each slat has a first portion 34 and second portion 36 corresponding to the two sides of the V. The first and second portions 34, 36 intersect (at the apex of the V) at an angle A. The angle A is selected to be generally between 90° and 160°, with all of the slats 22 within a single blind 10 exhibiting the same angle A. The first and second portions 34, 36 form the interior and exterior portion respectively of the slat 22 when it is in the neutral position. The first and second portions 34, 36 terminate in first and second edges 38, 40 that extend parallel to the longitudinal axis of the slat 22.

When the slats 22 of the blind 10 are in the inwardly facing position, the first portion 34 of each of the slats 22 lies substantially within a single vertical plane, as can be appreciated by reference to FIG. 3. Similarly, when the slats 22 are in the outwardly facing position, the second portion 36 lies generally within a single vertical plane, as is illustrated in FIG. 4. Preferably the distance between the support means of the ladders 14 is selected to be such that when the slats 22 are in the inwardly facing position, the second portion 36 of each slat extends sufficiently far toward the slat 22 immediately adjacent thereto to overlap the first portion 34 of the adjacent slat 22. Similarly, when the slats 22 are in the outwardly facing position, the first portion 34 of each slat extends sufficiently far toward the slat 22 immediately adjacent thereto to overlap the second portion 36 of the adjacent slat. Thus, when the slats 22 are in either the inwardly or outwardly facing position, light cannot pass through the blind 10 in a direction generally normal to the common plane in which either the first or second portions 34, 36 of the slats 22 lie without impinging on the slats.

Figure 8:
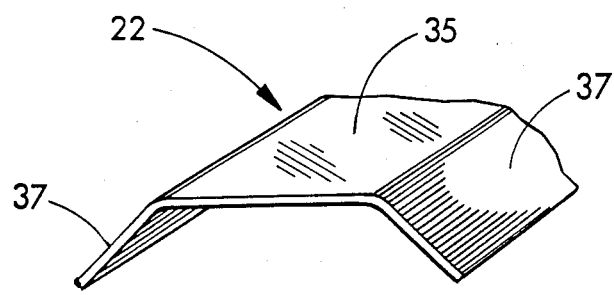
FIG. 8 is a perspective view of a different embodiment of the slats of the present invention illustrating the slats as flat-bottomed channels.
Figure 9:
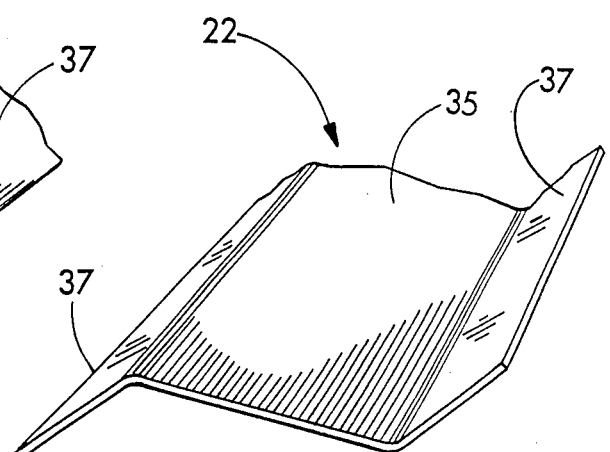
FIG. 9 is a perspective view of a different embodiment of the slats of the present invention illustrating the slats in Z-shaped cross-sectional shape.

The basic V cross-sectional slat shape disclosed has various advantages, including those disclosed herein. However, it will be apparent to one skilled in the art that two such V shapes may be combined to create related shapes. For example, the two V-shaped slats joined at an edge 38, 40 of each (or, expressed alternatively, having a portion 34, 36 in common) with both V's opening generally in the same direction form a flat-bottomed channel having a central portion 35 and end portions 37 as illustrated in FIG. 8. Two V's similarly joined but opening in generally opposite directions form a Z-shaped cross sectional shape as illustrated in FIG. 9. Where two V's are combined in a Z-shaped configuration, V angles of 45°-170° may be employed between slat portions. In this manner the central portions 35 may be translucent, opaque or reflective and the end portions 37 may be transparent. Thus, if the slats 22 are rotated such that the central portions 35 are co-planar, the blinds will have a privacy effect. Alternatively, if the slats 22 are rotated such that one or both end portions 37 are in parallel position with each other, the blinds will be transparent. The end portions 37 of both single and combined V's may also differ in length, all within the scope and spirit of the invention.

The slats 22 are made of a material having selected light transmitting absorbing and reflecting qualities. Preferably at least one of the first and second portions 34, 36 is transparent so that a user of the blind 10 may see out through the transparent portions with minimal obstruction. As it is used in this application, the term "transparent" means good optical quality. The good optical qualities of the slats permit unobstructed and undistorted vision through the slats when the blind is placed over a window, even when the material of the slats is tinted or coated to reduce total light transmission. The optical clarity of the slats is achieved through use of polycarbonate plastic in the slats. Polycarbonate plastic, in addition to excellent visible light-transmitting qualities with low haze when subjected to strong light, also possesses thermal, mechanical, and physical characteristics of importance to the practice of the invention, which is described more thoroughly later on in this specification. If the first portions 34 are transparent and the slats 22 are in the inwardly facing position with the first portions substantially within a single plane, a minimum of distortion of the view seen through the blind 10 will occur. In the event the second portion 36 is transparent, the same analysis holds when the slats 22 are in the outwardly facing position. The transparent material from which the slats 22 may be made may be colored to screen out glare or provide an aesthetically pleasing tint when viewed from either the interior of exterior sides 11, 13. The transparent material may be blackened to a desired shade to reduce the total transmission of light. Likewise, a transparent material may be selected that is substantially opaque to ultraviolet light, infrared light, or any other selected range of light wavelengths. Alternatively, the slats 22 may be made of a material that both transmits and diffuses visible light, a quality that hereinafter will be referred to as "translucency."

The transparent slats 22 may also be made highly specular, or highly specular on one surface and relatively non-specular on the other surface. The term "specular" as used herein refers to the ability of an object to reflect light without scattering, i.e., having a mirror-like quality. Slats 22 so rendered will permit visibility when viewing through them from a side where the light is weak toward the side where it is strong. When viewed through from the opposite side, however, they present a mirror-like appearance and restrict vision. Thus, by day they can be used to provide visual privacy for the occupants of a room. At night, visual privacy can be provided by creating artificial light outside the window or between the window and the blind. The artificial light is substantially stronger than the light that is within the room. This light additionally provides a source of exterior lighting for the room to give a daylight effect. Further, by having one surface of slats 22 highly specular and the other surface relatively non-specular when viewing through the slats from the latter surface, there is less specular reflection back to the viewer to interfere with visibility.

An important function of such slats is that they can be used to substantially reflect back radiant heat coming in from a strong light source while still permitting a substantial amount of visible light to be transmitted through them. When the highly specular surfaces are turned toward the stronger light source, they provide attractive mirror-like effects when viewed from that side, which is important to architects and interior designers from a deocorative standpoint.

In one preferred embodiment of the invention, the first and second portions 34, 36 of the slats 22 are made of the same material and have the same light-transmitting qualities. However, in an alternative embodiment, the light-transmitting abilities of the first and second portions differ. Thus, one portion may be transparent and have a selected color. The remaining portion may be transparent and of a different color, shade of black, translucency, opaqueness, reflectiveness, or the like. It will be appreciated that in either the inwardly facing or outwardly facing portions, whichever position 34, 36 of the slats 22 are substantially co-planar will be responsible for the predominating effect on light passing through the blind 10 in a direction generally normal to the plane. Thus, slats 22 in which the first and second portions 34, 36 have different colors may be changed from the inwardly facing to the outwardly facing position with the effect of changing the perceived color of the blind 10. One of the first and second portions 34, 36 may be made darker than the other, allowing the selection of the degree to which the glare of a bright day can be eliminated.

Figure 10:
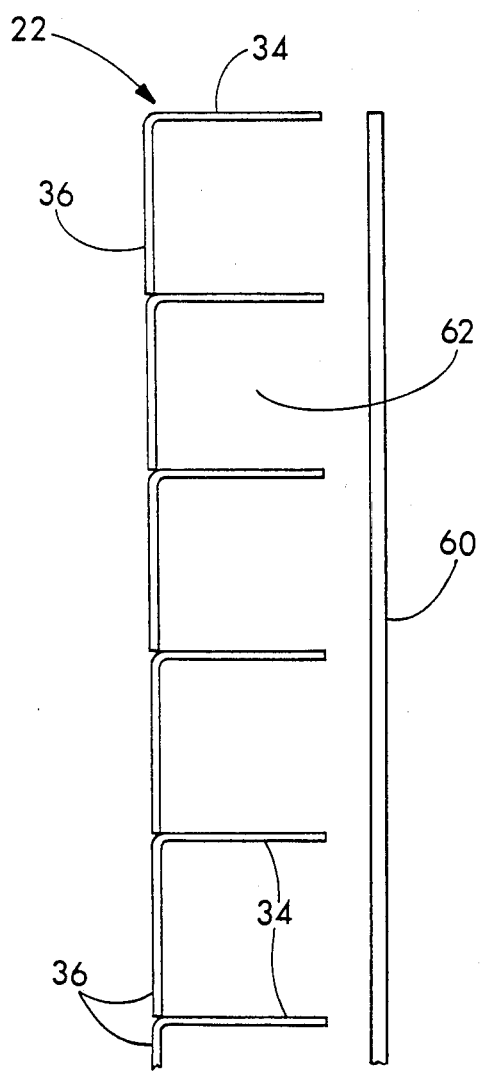
FIG. 10 is a schematic side elevation view showing the slats illustrated in FIG. 7 in corresponding relationship with a window.

If the angle A is made approximately equal to 90°, as is shown in FIGS. 7 and 10, and if one of the first and second portions 34, 36 is made of a material that is translucent, opaque, or reflective, that portion can be moved to the co-planar position and completely obstruct the view through the blind, providing privacy, darkness, the reflection of radiant energy, or comparable effects, depending on the nature of the material used. The other portion may be transparent, for example, providing in a single blind 10 the option of subjecting substantially all of the light entering through the blind to two entirely different light modifying treatments.

Figure 11:
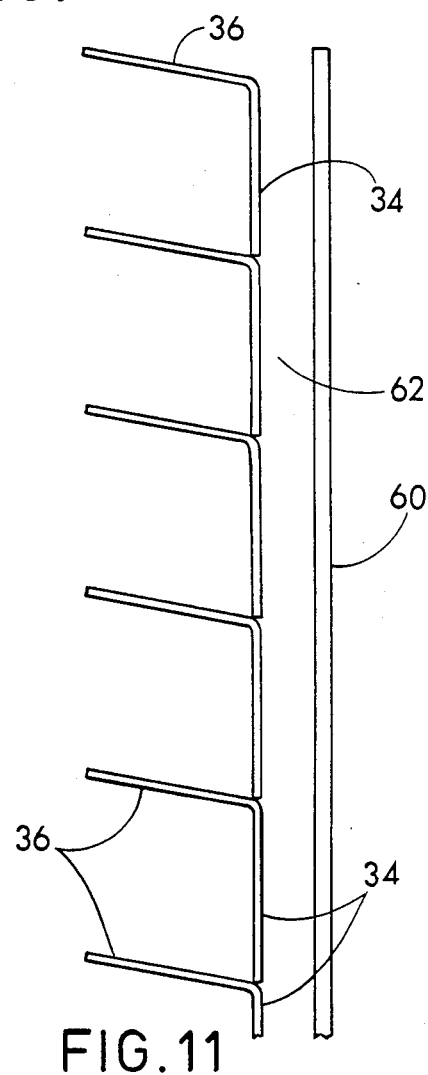
FIG. 11 is a schematic side elevation view showing slats having a slightly obtuse angle but in alternate relationship with a window.

Referring now to FIGS. 10 and 11, an additional advantage which can be achieved through use of blinds of the present invention, especially when the angle A formed at the intersection of the first and second portions 34, 36 is between approximately 90° as in FIG. 10 and approximately 100° as in FIG. 11, is the improved conductive heat insulating properties of the blinds in relationship with an outside window 60. The window 60 is a standard window known to the art formed of a material, such as glass, which transmits light substantially completely. The window 60 is at a sufficient distance from the slats 22 to allow for clockwise and counterclockwise rotation of the slats 22 without interfering with the first and second portions 34, 36.

In the closed position, as illustrated in FIG. 10, the second portions 36 of the slat 22 form a nearly continuous co-planar "panel" held in an essentially parallel, spaced-apart relationship with the window 60 to define a conductive heat insulating air space 62 between the window and the "panel". The horizontally disposed first portions 34 are held in spaced-apart, parallel relationship between the co-planar second portions 36 and the window 60, and act as convection defeating means which prevent free convection currents from developing in the air space between the co-planar second portion 36 and the window 60. Thus, the combination of the blind of the present invention and the window 60 act in concert to permit the passage of light while reducing unwanted flow of heated air due to convection. The reduction in air flow between the blind and the window results in a conductive heat transfer insulating air space 62 between the window exposed to the exterior and the panel exposed to the interior air.

In an alternative embodiment, as illustrated in FIG. 11, slats 22 are shown to have an angle of approximately 100°. Additionally, the slats 22 have been rotated clockwise 90° from the position illustrated in FIG. 10 such that the second portions 36 are turned away from the window 60. In this manner, a somewhat smaller insulating air space 62 is formed between the co-planar first portions and the window 60, but additionally, the first and second portions 34, 36 provide a substantial surface coefficient of insulating air associated with the slats 22 extending away from the pane.

It will therefore be appreciated that the blinds of FIGS. 10 and 11, in addition to the option of subjecting all of the light entering through the blinds to two entirely different light modifying treatments, provides important insulating properties in both positions shown against the transfer of heat through the window by conduction. Further, by making the slats 22 of the blind highly specular, radiant heat, which travels readily through air, can also be substantially prevented from passing through the window.

Further still, by making the first portion 34 highly specular but also transparent and the second portion 36 relatively non-specular and transparent, it will be appreciated that on a hot day when the first portions 34 are turned so that they present a planar surface in relation to the window, radiant heat and conductive heat will both be substantially prevented from entering through the window. On a cold day when the second portions 36 are turned so that they present a planar surface in relation to the window, radiant heat will be substantially permitted to enter through the window. At the same time, conductive heat will be substantially prevented from escaping through the window. In either case, substantial visibility will be maintained to the outside.

The slats 22 of the invention may be made of polycarbonate plastics. The term "polycarbonate" as used herein includes alloys of polycarbonate, and includes other plastics exhibiting the particular characteistics of polycarbonate described herein. Polycarbonate plastics alloyed with polyolefins, ABS, polyesters, and other plastics are known in the art and are well suited to many embodiments of the invention disclosed herein. A wide variety of light-transmitting qualities may be imparted to such plastics by mixing coloring and blackening material in with the plastic when it is formulated, coating plastic stock material on either on or all sides, laminating, and the like. Such plastics may be immersed in or sprayed with materials that chemically bond with the plastic, may be painted or otherwise treated with materials that simply adhere to the surface of the underlying plastic, or may be subjected to a mechanical surface treatment selected to render a transparent plastic translucent such as, for example, roughening the surface. Selected parts of a slat 22 may be subjected to such treatments independent of the rest of the slat.

Polycarbonate plastics are preferred also because they have important fire-resisting qualities. Such plastics are available that, in thickness of 0.062 inches, achieve a V-1 ("self-extinguishing—1") rating under the Underwriters Lab Flammability Test, Bulletin 94, and an SE ("self-extinguishing") rating under the ASTM D635-68 flammability test. Bromine-modified forms of the plastic are available that, when subjected to the same tests and in the same thickness, attain a V-O Underwriters Lab rating and an NB ("non-burning") ASTM D635-68 rating. The polycarbonate plastics sold by the General Electric Company under the trademark "LEXAN" are examples of such plastics. Favorable flammability characteristics are very important when many slats 22 are used even in a single blind 10. Control of fire hazards is even more important when many blinds 10 are located within a given area or building.

Polycarbonate plastics also are preferred because they exhibit low creep over long periods of time, do not distort when subjected to temperatures as high as 270° F., are free from odor, are low conductors of heat, have excellent strength properties, and are malleable and ductile.

Additionally, polycarbonate plastics are advantageous in that when produced as a slat for venetian-type blinds they are lightweight due to the thinness of the slat and the relative low density of the polycarbonate material. The polycarbonate material also allows an advantageous flexibility and resilience of the slats which permits the slats to flex rather easily and return to the original position when released. The polycarbonate slats can be cold-formed to form a V-shaped slat with the stiffness required to be non-sagging between widely spaced suspension points. As mentioned previously, the polycarbonate slats produced from Lexan ®, which is extruded from hot melt and calendered and planished by chill rolls, provide outstanding optical quality permitting very clear and undistorted vision through the slats when the blind is placed over a window. Further, the polycarbonate plastic provides a superior suitability of the slats to different light-transmitting treatments, including optically clear but tinted when turned in one direction and translucent, opaque, or reflective when turned in the opposite direction. Further still, the polycarbonate slats of the blind can prevent passage of selected wavelengths of visible light while at the same time permit vision through the slats of the blinds with outstanding optical clarity.

In the method for making slats 22 of the invention, a strip 42 of planar, plastic stock material of a selected width is prepared. Commonly plastic is manufactured in rolls of considerable width, in which case strips 42 may be prepared having a width substantially equal to that of the slat 22 to be manufactured by slitting, sawing, shearing, or the like. Preferably, the strip 42 of planar, plastic stock material so prepared is of indefinite length and is of sufficient flexibility that the strip may be stored as a reel 44 for convenient handling.

The strip 42 is then cold-formed to impart to it the V shape disclosed above. "Cold-forming" is the process of changing the shape of a stock material by mechanical manipulation without the application of heat sufficient to render the stock material thermoplastic. Preferably, the strip 42 is directed lengthwise between male and female forming rolls 46, 48. The forming rolls 46, 48 are generally circular and are adapted to rotate about their central axes.

The male forming roll 46 has an annular male forming member 50 that terminates in a V-shaped male forming surface 52. The apex of the male forming surface 52 has a radius selected to impart a generally V-shaped transverse cross sectional configuration to the strip (destined to become the first and second portions 34, 36 of the slat 22 being formed) corresponding to the two sides of the V, and intersecting at the apex of the V at the selected angle A of 90° to 160° desired in the finished slat 22.

The female forming roll 48 has two, annular female forming members 54 separated by a selected distance. Preferably the female forming members 54 terminate in a generally rounded female forming surfaces 56, although the female forming surface may also be flat, or even present an edge toward the male forming roll 46, all within the scope and spirit of the invention. The axes of the male and female forming rolls 46, 48 are oriented parallel to each other with the male forming surface 52 extending between the female forming surfaces 56. As a strip 42 is directed between the male and female forming rolls 46, 48, the male forming surface 52 deflects the strip into a V shape of the sort exhibited by the slats 22, as disclosed above. The male forming roll 46 is so located relative to the female forming roll 48 that, as the male forming surface 52 is inserted further and further between the female forming surfaces 56, the angle A imparted to the strip 42, corresponding to the angle A as defined relative to slats 22, is made smaller and smaller.

Alternative means for cold-forming the strip 42 are possible. For example, either one or both of the generally circular forming rolls 46, 48 disclosed above may be replaced by endless belts. Such belts may be held tautly by pulleys or be otherwise supported in an orientation relative to each other analogous to that disclosed for the circular forming rolls 46, 48. One belt may present outwardly a male forming surface analogous to that discussed above. The male forming surface may be inserted between two parallel belts, each presenting one female forming surface toward the male forming surface. It will be apparent that circular forming rolls and such endless belts may be used together, as well. For example, one or more male forming rolls 46, having the structure disclosed above, may be used with a pair of endless belts each presenting a female forming surface toward the male forming roll, one on either side thereof. The use of such systems, as well as the use of brakes and other cold-forming machinery known in the art, is well within the scope and spirit of the invention.

Many plastics exhibit a pronounced resilience, requiring that they be considerably deformed before the elastic limit of the plastic is exceeded and a permanently remaining shape may be successfully imparted to the plastic in a cold-forming process. As a consequence, gradual curves are difficult to impart to certain plastics by a cold-forming process. The plastic can be deformed into those curves while held between the forming members, but, if the curve is within the elastic limit of the plastic, when the forming members are withdrawn, the plastic returns to its original shape. Thus, the radius of the apex of the male forming surface 52 must be chosen to be such that the deformation of the plastic strip 42 over that radius is sufficient to exceed the elastic limit of the strip.

When a flat piece of material having a given thickness is bent, the part to the outside of the bend experiences the greatest strain. Thus, the elastic limit in the piece of material is exceeded first in that part to result in a permanent change of shape. As the material is selected to be increasingly thick, the elastic limit is exceeded with bends of increasingly large radii. When polycarbonate plastics are used to make slats 22, it has been found desirable to restrict the thickness of the slats to 1/16 inch or less. This is done to minimize weight, bulkiness, and expense. 1/16 inch (0.062 inch) polycarbonate plastic can be cold-formed with a male forming surface 52 having an apex with a radius of ¼ inch or less to impart a similar minimum or "knuckle" radius to the plastic at the inside of the bend. The slat thickness when the slats 22 are made of polycarbonate plastic is from 0.015 to 0.062 inches, and preferably 0.015 to 0.030 inches, in which case it has been found desirable to reduce the radius nearly to 0 and in any event to not more than ⅛ inch. Polycarbonate slats 22 of this thickness are lightweight and easily manipulated. Because of the V-shaped cross-sectional configuration disclosed above, the slats 22 are desirably stiff and do not sag between the supporting means or at the ends of the slats, even when the thickness is less than 0.015 inches. Nevertheless, the polycarbonate material is sufficiently flexible and resilient to withstand a great deal of the bending and flexing incidental to the normal use of a blind.

Many plastics exhibit "memory", the tendency to return to or toward an undeformed state after deformation. Consequently, it is sometimes necessary to impart an initial deformation to the strip 42 that exceeds that eventually desired. Then, after the strip 42 has exhibited such memory as it has been determined by experiment to have, the final deformation will be the desired one. The degree of deformation can be controlled by so locating the male and female forming rolls 46, 48 relative to each other that the male forming surface 52 extends increasingly between the female forming members 54. Depending on the plastic used to make the strip 42 it may be desirable to direct the strip between a series of male and female forming rolls 46, 48, as is illustrated schematically in FIG. 5, each pair of rolls increasingly deforming the strip to achieve a final degree of deformation.

The preferred plastic from which to prepare the strip 42 is polycarbonate plastic material of the sort discussed above. Such plastics may be conveniently coated with an acrylic plastic material to impart desired light-transmitting qualities to the strip 42. Acrylic plastics are generally more brittle than polycarbonate plastics and cannot be conveniently cold-formed, especially when considerable deformation is required. Consequently, when an acrylic-coated polycarbonate plastic strip 42 is prepared, it is desirable to heat the strip to a temperature of at least 125° F. but not more than 200° F. before subjecting the strip to cold-forming. This is especially desirable when an acrylic coating is applied to both surfaces of the strip 42. The acrylic-coated strip 42 should not be elevated in temperature to the point that the rigidity of the polycarbonate plastic is substantially changed. However, by heating the strip within the temperature range indicated, the acrylic plastic coating is rendered thermoelastic and capable of moving with the polycarbonate plastic strip through the cold-forming process without separating therefrom or otherwise being rendered unsatisfactory. The result is a cold-formed plastic strip 42 having a surface coated with acrylic plastic exhibiting a hardness and optical qualities unobtainable in uncoated polycarbonate plastic.

Either before or after the strip 42 has been deformed by the male and female forming rolls 46, 48, it is directed to conventional punches adapted to cut portions of the strip to desired slat lengths and to create cord slots 30. Such punches are shown schematically in FIG. 5, where first punch 58 is adapted to create cord slots 30. The strip 42 is then advanced through a second punch 60 until the desired slat length extends beyond the second punch. The second punch 60 is adapted to cut off the slat 22, imparting a desirably curved contour both to the end the slat 22 so separated from the strip 42 and to the now leading end of the strip 42 remaining. By this means, a single punch 60 in one step imparts the desired shape to the trailing end of first slat 22 and the leading end of the next slat 22. The slats 22 so formed may be fed into the ladders 14 and suspended upon rungs 18 or other support means, as disclosed above, by conventional automatic machinery.

It will be appreciated that the method of manufacture disclosed above has many advantages. The method provides for a continuous feed of stock material and a continuous production of slats 22. As opposed to a molding process, the cold-forming process is fast and efficiently requires no molding time or the procurement of sophisticated molds. The male and female forming rolls 46, 48 may be adjustable so that a single forming operation may be adapted to manufacture slats 22 exhibiting a variety of angles A. Furthermore, since the process is one of cold-forming, the movement of the strip 42 may be interrupted or periodic if that is desirable to aid the functioning of the punches or other aspects of the machinery. Upon being stopped in its movement through the cold-forming machinery, no portion of the strip 42 remains between heated rollers that might cause it to be unevenly deformed.

It is understood that the present invention is not limited to the particular construction and arrangement of parts illustrated and disclosed, nor to the particular materials disclosed, nor to the particular steps disclosed herein. Instead, it embraces all such modified forms thereof as come within the scope of the following claims.

I claim:

1. A blind having an interior side and an exterior side and comprising:

(a) a plurality of elongated slats made of lightweight, flexible and generally resilient polycarbonate plastic material having a thickness not greater than 0.062 inches and selected light-transmitting qualities, each slat being bent by means of cold-forming without the application of heat to provide a transverse cross-sectional configuration in which a first longitudinally extending portion and a second longitudinally extending portion of the slat intersect to form a selected angle of not more than 170°, the angled slat structure imparting sufficient stiffness to the slat so that the slat will not substantially sag between and beyond widely spaced suspension points, and wherein at least one of the first and second portions is transparent, said transparent slat portion transmitting visible light with a minimum of distortion; and (b) means for suspending the slats in parallel relation, the suspension means being adapted to rotate the slats about their longitudinal axes between an inwardly facing position, in which first surfaces of the slats are presented at the interior side of the blind with the first portions of the slats lying substantially within a single plane, and an outwardly facing position in which the first surfaces of the slats are presented at the exterior side of the blind and the second portions of the slats lie generally within a single plane, the suspension means being further adapted to hold the slats at a distance from each other such that when the slats are in one of the inwardly facing and outwardly facing positions the portions of the slats not then co-planar extend sufficiently far toward the slat immediately adjacent thereto as to substantially prevent the passage of light in a direction generally normal to the co-planar portions of the slats without that light being interrupted by the slats.

2. The blind of claim 1 wherein at least one of the first and second portions of the slats is transparent to selected wavelengths of visible light and substantially opaque to ultraviolet light.

3. The blind of claim 1 wherein the first and second portions of the slats have different light-transmitting qualities.

4. The blind of claim 3 wherein the angle is approximately 90°–110°.

5. The blind of claim 4 wherein one of the first and second portions is transparent to selected wavelengths of visible light and the other portion is opaque to visible light.

6. The blind of claim 1 wherein the slats each have a second surface on the opposite side of the slat from the first surface, and at least one of the first and second surfaces has a selected surface treatment and the appearance of a selected part of the first surfaces of the slats is different from the appearance of a selected part of the second surfaces of the slats.

7. The blind of claim 1 wherein one of the first and second portions is transparent to selected wavelengths of visible light and the other portion is translucent to visible light.

8. The blind of claim 1 wherein at least one of the first and second portions is specular in order to reflect light without scattering it.

9. The blind of claim 1 wherein the selected angle is approximately 90°–110°.

10. The blind of claim 9 in combination with a window which allows the passage of radiant energy therethrough, wherein the second portions of each of the slats are essentially coplanar to the window such that the second portions of the slats essentially form a panel in substantially parallel relationship to the window to define an insulating air space between the panel and the window and the first portions of each of the slats are in substantially horizontal and parallel relationship with each other between the coplanar position of the second portion of the slat and the window, such that the first portions of the slats reduce convective heat flow within the air space between the coplanar second portions and the window.

11. The blind of claim 9 in combination with a window which allows the passage of radiant energy therethrough, wherein the first portions of each of the slats are essentially coplanar to the window such that the first portions of the slats essentially form a panel in substantially parallel relationship to the window to define an insulating air space between the panel and the window and the second portions of each of the slats are in substantially horizontal and parallel relationship with each other on the panel away from the window, such that the first and second portions of the slats provide a substantial surface coefficient of insulating air associated with the slats extending away from the window.

12. The blind and window combination of claim 10 wherein the second portions of each of the slats are transparent and are highly specular to reflect radiant heat, and the first portions are transparent and relatively non-specular to permit the passage of radiant heat therethrough.

13. The blind and window combination of claim 10 wherein the first portions of each of the slats are transparent and are highly specular to reflect radiant heat, and the second portions are transparent and relatively non-specular to permit the passage of radiant heat therethrough.

14. A slat adapted for use in a multi-slat blind wherein a plurality of slats are suspended in parallel relation and are adapted to be rotated about their longitudinal axes, comprising: an elongated slat made of lightweight, flexible and generally resilient polycarbonate plastic having a thickness not greater than 0.062 inches and selected light transmitting, absorbing and reflecting qualities, the slat having a first surface and a second surface and being bent by means of cold forming and devoid of heat treatment to provide a transverse cross-sectional configuration in which a first longitudinally extending planar portion and a second longitudinally extending planar portion of the slat intersect at a selected angle of not more than 170°, the angled slat structure imparting sufficient stiffness to the slat so that the slat will not substantially sag between and beyond widely spaced suspension points, wherein at least one of the first and second portions is transparent, said transparent slat portion transmitting visible light with a minimum of distortion.

15. The slat of claim 14 wherein the first and second portions have differing light-transmitting qualities.

16. The slat of claim 15 wherein the angle is approximately 90°–110°.

17. The slat of claim 16 wherein one of the first and second portions is transparent to selected wavelengths of visible light and the other portion is opaque to visible light.

18. The slat of claim 16 wherein one of the first and second portions is transparent to selected wavelengths of visible light and the other portion is translucent to visible light.

19. The slat of claim 16 wherein at least one of the first and second portions is specular in order to reflect light without scattering it.

20. The slat of claim 14 wherein the first and second surfaces of the slat have selected surface treatments and the appearance of a selected part of the first surface of the slat is different from the appearance of a selected part of the second surface of the slat.

21. The slat of claim 16 wherein the first portion is transparent and is specular to reflect radiant heat, and wherein the second portion is transparent and relatively non-specular to permit the passage of radiant heat therethrough.

22. A slat adapted for use in a multi-slat blind wherein a plurality of slats are suspended in parallel relation and are adapted to be rotated about their longitudinal axes, comprising:

an elongated slat made of lightweight, flexible, and generally resilient planar polycarbonate plastic material having a thickness not greater than 0.062 inches and selected light-transmitting, absorbing, and reflecting qualities, the slat having a permanent V-shaped transverse cross-sectional configuration with a longitudinally extending bend between first and second planar portions, the V-shaped structure imparting sufficient stiffness to the slat so that when supported horizontally the slat will not substantially sag between and beyond widely spaced suspension points, the bend having an inside radius of curvature of not more than ¼ inch, the planar material of the first and second portions of the strip on either side of the bend being unaltered by mechanical manipulation or heat, at least one of the first and second portions being transparent, said transparent portion transmitting visible light with a minimum of distortion.

* * * * *

UNITED STATES PATENT AND TRADEMARK OFFICE
CERTIFICATE OF CORRECTION

PATENT NO. : 4,799,526

DATED : January 24, 1989

INVENTOR(S) : John F. Reeves

It is certified that error appears in the above-identified patent and that said Letters Patent is hereby corrected as shown below:

Title page

Inventor line  "John R. Reeves" should be
         --John F. Reeves--.

Column 2, line 12  "present" should be --prevent--;

Column 2, line 33  the semicolon should be deleted and
         a comma inserted after "transmitting".

Column 8, line 10  "characteistics" should be
         --characteristics--.

Signed and Sealed this

Fifth Day of June, 1990

Attest:

HARRY F. MANBECK, JR.

*Attesting Officer*   *Commissioner of Patents and Trademarks*